(12) United States Patent
Sharma et al.

(10) Patent No.: US 12,459,527 B2
(45) Date of Patent: Nov. 4, 2025

(54) RISK INFORMED ROUTE PLANNER

(71) Applicant: GM Global Technology Operations LLC, Detroit, MI (US)

(72) Inventors: Manoj Kumar Sharma, Troy, MI (US); Donald K. Grimm, Utica, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 18/469,095

(22) Filed: Sep. 18, 2023

(65) Prior Publication Data
US 2025/0091597 A1    Mar. 20, 2025

(51) Int. Cl.
| | |
|---|---|
| *B60W 50/14* | (2020.01) |
| *B60K 35/00* | (2024.01) |
| *B60W 30/095* | (2012.01) |
| *G06V 10/764* | (2022.01) |
| *G06V 20/58* | (2022.01) |
| *B60K 35/23* | (2024.01) |
| *B60K 35/28* | (2024.01) |
| *B60K 35/29* | (2024.01) |

(52) U.S. Cl.
CPC ............ *B60W 50/14* (2013.01); *B60K 35/00* (2013.01); *B60W 30/0956* (2013.01); *G06V 10/764* (2022.01); *G06V 20/58* (2022.01); *B60K 35/23* (2024.01); *B60K 35/28* (2024.01); *B60K 35/29* (2024.01); *B60K 2360/177* (2024.01); *B60K 2360/178* (2024.01); *B60K 2360/179* (2024.01); *B60K 2360/188* (2024.01); *B60W 2050/146* (2013.01); *B60W 2554/80* (2020.02)

(58) Field of Classification Search
CPC ............ B60W 50/14; B60W 30/0956; B60W 2554/80; B60W 2050/146; G06V 20/58; G06V 10/764; B60K 35/00; B60K 2360/178; B60K 35/28; B60K 35/23; B60K 35/29; B60K 2360/188; B60K 2360/179; B60K 2360/177
See application file for complete search history.

(56) References Cited

FOREIGN PATENT DOCUMENTS

| | | | | |
|---|---|---|---|---|
| DE | 102010040803 A1 | | 3/2012 | |
| DE | 102012009297 A1 | | 12/2012 | |
| DE | 102020210336 A1 | * | 2/2022 | ........ B60W 30/0956 |
| DE | 102021114620 A1 | | 6/2022 | |
| KR | 20170101758 A | * | 9/2017 | ............ G02B 27/01 |

\* cited by examiner

*Primary Examiner* — Michael D Lang
(74) *Attorney, Agent, or Firm* — Vivacqua Crane, PLLC

(57) ABSTRACT

A system for providing an alert to an occupant within a vehicle includes a system controller in communication with a plurality of onboard sensors, other vehicles and infrastructure systems, an augmented reality head up display system and a full windshield display system, each adapted to project images onto an inner surface of a windshield of the vehicle, the system controller adapted to detect at least one approaching vehicle, calculate a distance from the intersection, speed and trajectory of the at least one approaching vehicle, determine if the at least one approaching vehicle poses a threat and classify the at least one approaching vehicle as a threat vehicle, and provide a warning message and augmentation graphics by projecting the warning message and augmentation graphics onto the inner surface of the windshield with at least one of the AR-HUD system and the full windshield display system.

20 Claims, 10 Drawing Sheets

RISK INFORMED ROUTE PLANNER

INTRODUCTION

The present disclosure relates to a system and method for providing warnings to an occupant within a vehicle to inform the occupant of threat vehicles when the vehicle is located at an intersection.

Vehicles are equipped with many sensors to monitor the environment surrounding the vehicle, and to provide warnings when objects get to close, etc. Vehicles are also equipped with mirrors to allow an occupant within the vehicle to see objects in proximity to the vehicle that may be approaching the vehicle. Current sensor systems and mirrors of a vehicle are not adapted to actively monitor other vehicles that are approaching an intersection to probabilistically determine if such approaching vehicles are a threat to the vehicle, notify the occupant within the vehicle of the threat and provide warning messages and augmentation graphics onto a window surface within the vehicle to warn the occupant, highlight threat vehicles and provide route suggestions to avoid the threat vehicles.

Thus, while current systems and methods achieve their intended purpose, there is a need for a new and improved system and method for providing warnings to an occupant within a vehicle to inform the occupant of threat vehicles when the vehicle is located at an intersection.

SUMMARY

According to several aspects of the present disclosure, a method of providing an alert to an occupant within a vehicle to inform the occupant of threat vehicles when the vehicle is located at an intersection includes detecting, with a system controller in communication with a plurality of onboard sensors, wireless communication with other vehicles and wireless communication with infrastructure systems, at least one approaching vehicle that is moving toward the intersection, calculating, with the system controller, a distance from the intersection, speed and trajectory of the at least one approaching vehicle, determining, with the system controller, if the at least one approaching vehicle poses a threat and if the at least one approaching vehicle poses a threat, classifying the at least one approaching vehicle as a threat vehicle, providing a warning message and augmentation graphics onto an inner surface of a windshield of the vehicle by at least one of: projecting the warning message and augmentation graphics onto the inner surface of the windshield with an augmented reality head up display system (AR-HUD), changing a color of route guidance graphics currently being displayed by the AR-HUD, and projecting the warning message and augmentation graphics onto the inner surface of the windshield with a full windshield display system.

According to another aspect, the providing a warning message and augmentation graphics onto an inner surface of a windshield of the vehicle further includes: determining, with the system controller, the warning message and the augmentation graphics to be provided; determining, with the system controller, if the warning message and the augmentation graphics will fit within a field of view (FOV) of the AR-HUD system, projecting the warning message and augmentation graphics onto the inner surface of the windshield with the AR-HUD system when the warning message and the augmentation graphics fit within the FOV of the AR-HUD system, and projecting the warning message and augmentation graphics onto the inner surface of the windshield with the full windshield display system when the warning message and the augmentation graphics do not fit within the FOV of the AR-HUD system.

According to another aspect, the determining, with the system controller, if the at least one approaching vehicle poses a threat and if the at least one approaching vehicle poses a threat, classifying the at least one approaching vehicle as a threat vehicle further includes: calculating, with a machine learning algorithm, a probability that the at least one approaching vehicle will collide with the vehicle, and classifying the at least one approaching vehicle as a threat vehicle when the probability that the at least one approaching vehicle will collide with the vehicle exceeds a first pre-determined threshold.

According to another aspect, the providing a warning message and augmentation graphics onto an inner surface of a windshield of the vehicle further includes: providing a warning message including textual information, and providing augmentation graphics that includes at least one of: trajectory arrows, highlighting of threat vehicles, and warning icons.

According to another aspect, the determining, with the system controller, the warning message and the augmentation graphics to be provided further includes predicting, with the machine learning algorithm, a route for each of the at least one approaching vehicle that is classified as a threat vehicle, and the providing a warning message and augmentation graphics onto an inner surface of a windshield of the vehicle further includes projecting augmentation graphics including the predicted route for each of the at least one approaching vehicle that is classified as a threat vehicle onto the inner surface of the windshield of the vehicle with the full windshield display.

According to another aspect, the determining, with the system controller, the warning message and the augmentation graphics to be provided further includes calculating, with the system controller and the machine learning algorithm, a suggested route for the vehicle, wherein the probability that any of the at least one approaching vehicle that is classified as a threat vehicle will collide with the vehicle, if the vehicle follows the suggested route, is less than the pre-determined threshold, and the providing a warning message and augmentation graphics onto an inner surface of a windshield of the vehicle further includes projecting augmentation graphics including the suggested route for the vehicle onto the inner surface of the windshield of the vehicle with the full windshield display.

According to another aspect, the classifying the at least one approaching vehicle as a threat vehicle when the probability that the at least one approaching vehicle will collide with the vehicle exceeds a first pre-determined threshold further includes: classifying the at least one approaching vehicle as a low-risk threat vehicle when the probability that the at least one approaching vehicle will collide with the vehicle exceeds the first pre-determined threshold, classifying the at least one approaching vehicle as a medium-risk threat vehicle when the probability that the at least one approaching vehicle will collide with the vehicle exceeds a second pre-determined threshold, and classifying the at least one approaching vehicle as a high-risk threat vehicle when the probability that the at least one approaching vehicle will collide with the vehicle exceeds a third pre-determined threshold.

According to another aspect, the determining, with the system controller, the warning message and the augmentation graphics to be provided further includes determining, with the system controller, the warning message and the augmentation graphics to be provided for each of the at least one approaching vehicle that is classified as a threat vehicle based on the classification of each threat vehicle as one of a low-risk threat vehicle, a medium risk threat vehicle or a high-risk threat vehicle.

According to another aspect, the method further includes providing a secondary warning message and secondary augmentation graphics onto an inner surface of at least one of a side window of the vehicle and a rear window of the vehicle by projecting the secondary warning message and secondary augmentation graphics onto the inner surface of at least one of the side window of the vehicle and the rear window of the vehicle with the full windshield display system.

According to another aspect, the method further includes providing information related to an intended route of the vehicle to entities outside the vehicle by projecting the information related to an intended route of the vehicle onto the inner surface of at least one of the side window of the vehicle and the rear window of the vehicle with the full windshield display system.

According to several aspects of the present disclosure, a system for providing an alert to an occupant within a vehicle to inform the occupant of threat vehicles when the vehicle is located at an intersection includes a system controller in communication with a plurality of onboard sensors and having a wireless communication module adapted to allow the system controller to communicate with other vehicles and infrastructure systems, an augmented reality head up display system (AR-HUD) in communication with the system controller and adapted to project images onto an inner surface of a windshield of the vehicle, and a full windshield display system adapted to project images onto the inner surface of the windshield of the vehicle, the system controller adapted to: detect, via communication with the plurality of onboard sensors and wireless communication, via the wireless communication module, with other vehicles and infrastructure systems, at least one approaching vehicle that is moving toward the intersection, calculate a distance from the intersection, speed and trajectory of the at least one approaching vehicle, determine if the at least one approaching vehicle poses a threat and if the at least one approaching vehicle poses a threat, classify the at least one approaching vehicle as a threat vehicle, provide a warning message and augmentation graphics onto the inner surface of the windshield of the vehicle by at least one of: project the warning message and augmentation graphics onto the inner surface of the windshield with the AR-HUD system, change a color of route guidance graphics currently being displayed by the AR-HUD, and project the warning message and augmentation graphics onto the inner surface of the windshield with the full windshield display system.

According to another aspect, when providing a warning message and augmentation graphics onto the inner surface of the windshield of the vehicle, the system controller is further adapted to: determine what warning message and augmentation graphics are to be provided, determine if the warning message and the augmentation graphics will fit within a field of view (FOV) of the AR-HUD system, project the warning message and augmentation graphics onto the inner surface of the windshield with the AR-HUD system when the warning message and the augmentation graphics fit within the FOV of the AR-HUD system, and project the warning message and augmentation graphics onto the inner surface of the windshield with the full windshield display system when the warning message and the augmentation graphics do not fit within the FOV of the AR-HUD system.

According to another aspect, when determining if the approaching vehicle poses a threat and if the at least one approaching vehicle poses a threat, classifying the at least one approaching vehicle as a threat vehicle, the system controller is further adapted to: calculate, with a machine learning algorithm, a probability that the at least one approaching vehicle will collide with the vehicle, and classify the at least one approaching vehicle as a threat vehicle when the probability that the at least one approaching vehicle will collide with the vehicle exceeds a first pre-determined threshold.

According to another aspect, when providing a warning message and augmentation graphics onto the inner surface of the windshield of the vehicle, the system controller is further adapted to: provide a warning message including textual information, and provide augmentation graphics that includes at least one of: trajectory arrows, highlighting of threat vehicles, and warning icons.

According to another aspect, when determining what warning message and augmentation graphics are to be provided, the system controller is further adapted to predict, with the machine learning algorithm, a route for each of the at least one approaching vehicle that is classified as a threat vehicle, and when providing a warning message and augmentation graphics onto the inner surface of the windshield of the vehicle, the system controller is further adapted to project augmentation graphics including the predicted route for each of the at least one approaching vehicle that is classified as a threat vehicle onto the inner surface of the windshield of the vehicle with the full windshield display.

According to another aspect, when determining what warning message and augmentation graphics are to be provided, the system controller is further adapted to calculate, with the machine learning algorithm, a suggested route for the vehicle, wherein the probability that any of the at least one approaching vehicle that is classified as a threat vehicle will collide with the vehicle, if the vehicle follows the suggested route, is less than the pre-determined threshold, and when providing the warning message and augmentation graphics onto the inner surface of the windshield of the vehicle, the system controller is further adapted to project augmentation graphics including the suggested route for the vehicle onto the inner surface of the windshield of the vehicle with the full windshield display.

According to another aspect, when classifying the at least one approaching vehicle as a threat vehicle when the probability that the at least one approaching vehicle will collide with the vehicle exceeds a first pre-determined threshold, the system controller is further adapted to: classify the at least one approaching vehicle as a low-risk threat vehicle when the probability that the at least one approaching vehicle will collide with the vehicle exceeds the first pre-determined threshold, classify the at least one approaching vehicle as a medium-risk threat vehicle when the probability that the at least one approaching vehicle will collide with the vehicle exceeds a second pre-determined threshold, and classify the at least one approaching vehicle as a high-risk threat vehicle when the probability that the at least one approaching vehicle will collide with the vehicle exceeds a third pre-determined threshold, and, when determining what warning message and augmentation graphics are to be provided, the system controller is further adapted to determine what warning message and augmentation graphics are to be provided for each of the at least one approaching vehicle that is classified as a threat vehicle based on the classification of each threat vehicle as one of a low-risk threat vehicle, a medium risk threat vehicle or a high-risk threat vehicle.

According to another aspect, the system controller is further adapted to provide a secondary warning message and secondary augmentation graphics onto an inner surface of at least one of a side window of the vehicle and a rear window of the vehicle by projecting the secondary warning message and secondary augmentation graphics onto the inner surface of at least one of the side window of the vehicle and the rear window of the vehicle with the full windshield display system.

According to another aspect, the system controller is further adapted to provide information related to an intended route of the vehicle to entities outside the vehicle by projecting the information related to an intended route of the vehicle onto the inner surface of at least one of the side window of the vehicle and the rear window of the vehicle with the full windshield display system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
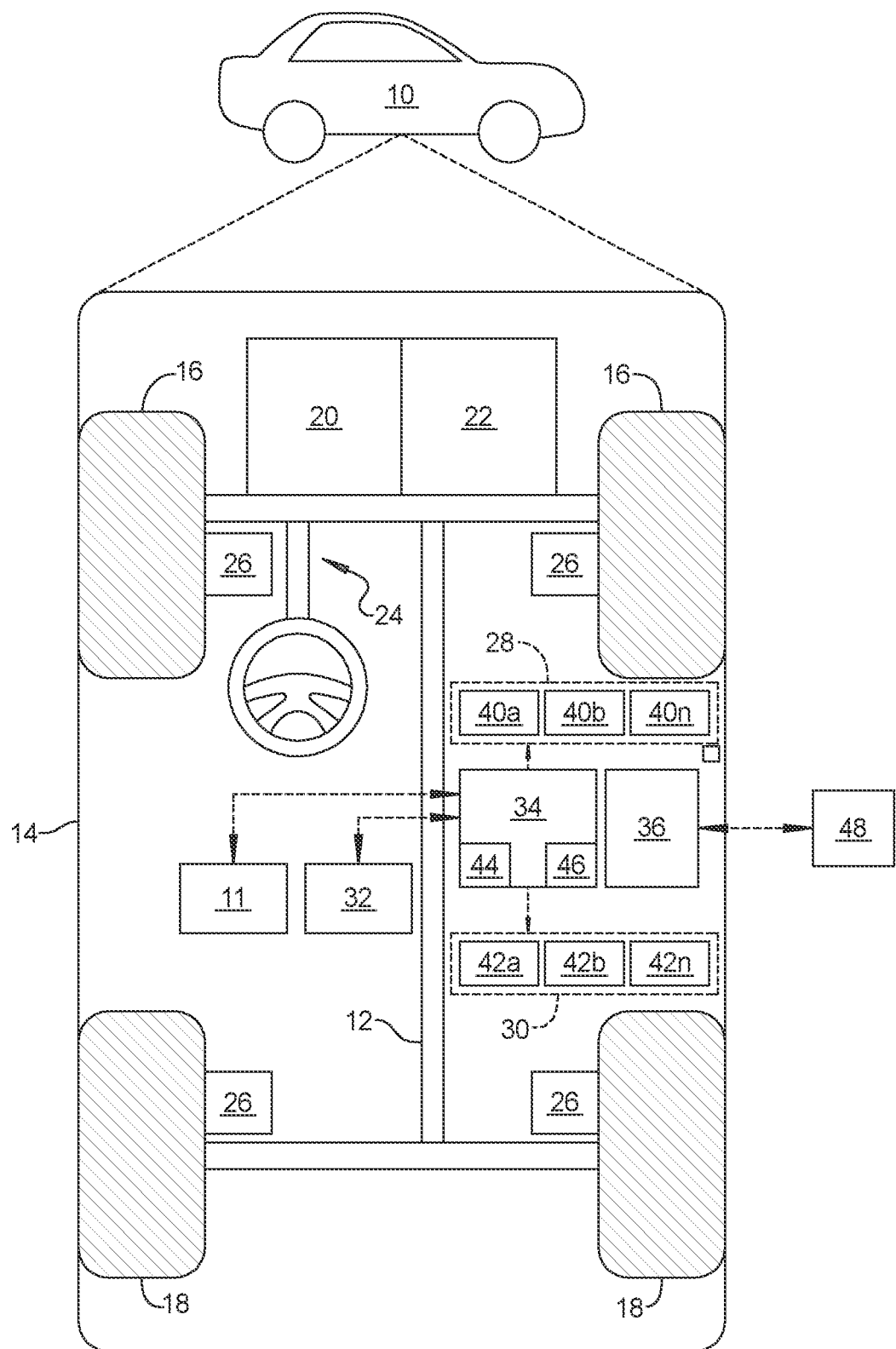
FIG. 1 is a schematic diagram of a vehicle having a system for providing a warning to an occupant of a hazardous object prior to the occupant exiting the vehicle according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing warnings to an occupant 56 within a vehicle 10 to inform the occupant 56 of threat vehicles when the vehicle 10 is located at an intersection in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
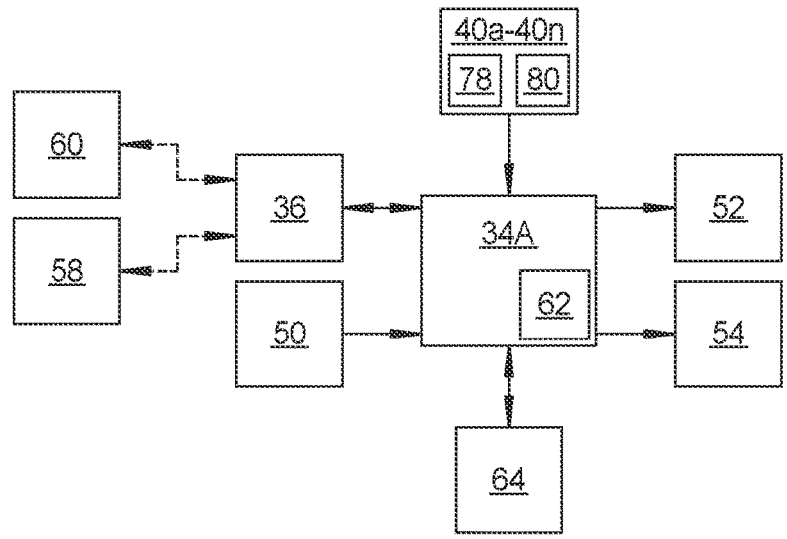
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an occupant monitoring system 50. The system 11 further includes an augmented reality head up display system (AR-HUD) 52 in communication with the system controller 34A and adapted to project images onto an inner surface 66 of a windshield 68 of the vehicle 10, and a full windshield display system 54 adapted to project images onto the inner surface 66 of the windshield 68 of the vehicle 10.

Figure 3A:
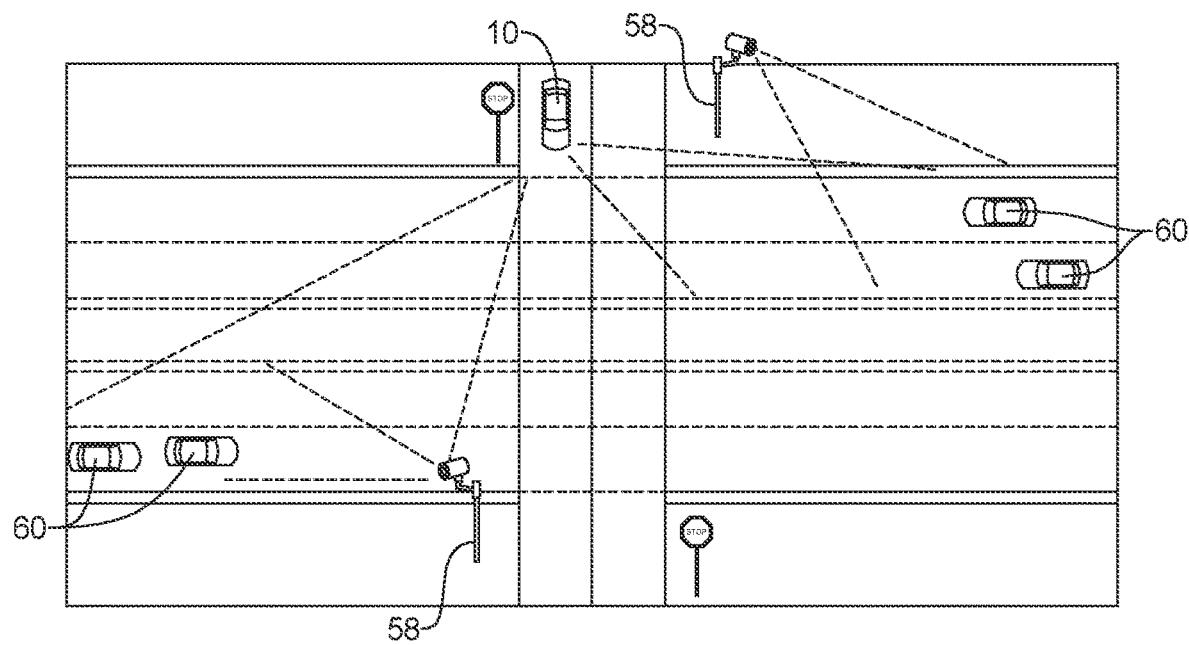
FIG. 3A is a schematic diagram of an intersection wherein a vehicle is about to make a left turn and sensors within the vehicle and infrastructure systems detect the presence of approaching vehicles.

Referring to FIG. 3A, the vehicle 10 is located at an intersection and is preparing to make a left turn. In an exemplary embodiment, the system controller 34A is adapted to detect, via communication with the plurality of onboard sensors 40a-40n and wireless communication, via the wireless communication module 36, with other vehicles and infrastructure systems 58 (as shown, a camera system), at least one approaching vehicle 60 that is moving toward the intersection. As shown, the system controller 34A identifies four vehicles 60A, 60B, 60C, 60D that are approaching the intersection.

The system controller 34A is further adapted to calculate, for each identified approaching vehicle 60, a distance from the intersection, speed and trajectory. Thus, for each of the four identified approaching vehicles 60A, 60B, 60C, 60D shown in FIG. 3A, the system controller calculates how far away from the intersection the approaching vehicle 60 is, how fast the approaching vehicle 60 is traveling, and the predicted path (trajectory) of the approaching vehicle 60. The system controller 34A may use a front camera that is one of the plurality of sensors 40a-40n in conjunction with a computer vision algorithm to estimate the distance and depth. Distance estimation is possible by using optical means or by using a monocular depth estimation (MDE) algorithm. Speed may be calculated by dividing the difference between the calculated distance to the intersection of two consecutive frames by the time span between the two consecutive frames. Speed and trajectory information for approaching vehicles 60 may also be obtained via Radar and Lidar sensors included in the plurality of onboard sensors 40a-40n as well as by wireless communication, via the wireless communication module 36, with other vehicles, infrastructure systems 58, etc.

The system controller 34A is adapted to use the calculated information of the distance, speed and trajectory for each of the approaching vehicles 60A, 60B, 60C, 60D to determine if the at least one approaching vehicle 60 poses a threat and if the at least one approaching vehicle 60 poses a threat, classify the at least one approaching vehicle 60 as a threat vehicle. In an exemplary embodiment, when determining if the approaching vehicle 60 poses a threat the system controller 34A is further adapted to probabilistically calculate, with a machine learning algorithm 62, a probability that the at least one approaching vehicle 60 will collide with the vehicle 10 if the vehicle proceeds with its planned maneuver, here a left turn. The system controller 34A determines the planned maneuver of the vehicle 10 based on gathering data from onboard systems (left blinker is on, GPS says turn left).

A database 64 in communication with the system controller 34A is adapted to store data related to past occurrences of classifying approaching vehicles 60 as a threat vehicle, as well as environmental aspects (weather, temperature, precipitation) and vehicle aspects during such past occurrences. The machine learning algorithm 62 is adapted to predict a probability that the at least one approaching vehicle 60 will collide with the vehicle 10 based on real-time data collected by the plurality of onboard sensors 40*a*-40*n*, analysis of captured images using computer vision and image recognition techniques and data from past occurrences from the database 64.

Various techniques are employed to extract meaningful features from sensor readings and data, including time-series analysis, frequency-domain analysis, and spatial-temporal patterns. The machine learning algorithm 62 includes a machine learning model which may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The machine learning model is trained with data collected from a plurality of different vehicles. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of threat vehicles. The machine learning model is trained on a labeled dataset and evaluated using various performance metrics such as accuracy, precision, recall, F1-score, and confusion matrix. The hyperparameters of the models are tuned to achieve optimal results. The machine learning model is further trained on training data and will learn to map input features to the corresponding probabilities.

Data from occurrences of the system controller 34A classifying approaching vehicles 60 as threat vehicles are saved to the database 64 and used to continuously update the machine learning algorithm 62. Thus, the system controller 34A uses the machine learning algorithm 62 and machine learning techniques to predict a probability that the at least one approaching vehicle 60 will collide with the vehicle 10 based on analyzing the real-time data collected by the plurality of onboard sensors 40*a*-40*n* and via wireless communication with other vehicles and infrastructure systems 58, analysis of captured images using computer vision and image recognition techniques and data from past occurrences from the database 64.

The system controller 34A is adapted to classify the at least one approaching vehicle 60 as a threat vehicle when the probability that the at least one approaching vehicle 60 will collide with the vehicle 10 exceeds a first pre-determined threshold. In an exemplary embodiment, the system controller 34A is adapted to classify the at least one approaching vehicle 60 as a "low-risk threat vehicle" when the probability that the at least one approaching vehicle 60 will collide with the vehicle 10 exceeds the first pre-determined threshold, to classify the at least one approaching vehicle 60 as a "medium-risk threat vehicle" when the probability that the at least one approaching vehicle 60 will collide with the vehicle 10 exceeds a second pre-determined threshold, and to classify the at least one approaching vehicle 60 as a "high-risk threat vehicle" when the probability that the at least one approaching vehicle 60 will collide with the vehicle 10 exceeds a third pre-determined threshold.

Figure 3B:
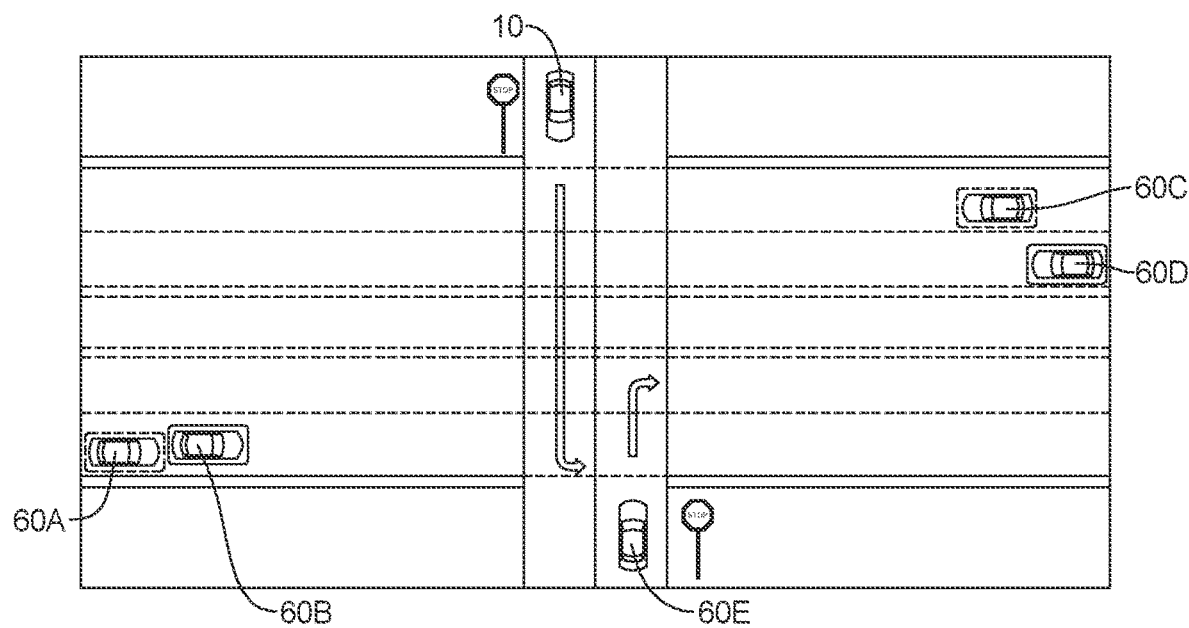
FIG. 3B is a schematic diagram of the intersection shown in FIG. 3A wherein the approaching vehicles are classified as threat vehicles.

For example, referring again to FIG. 3A, the first predetermined threshold is 5%, the second predetermined threshold is 25% and the third predetermined threshold is 50%. The system controller identifies five approaching vehicles 60, and referring to FIG. 3B, calculates a probability that each of the approaching vehicles 60 will collide with the vehicle 10, if the vehicle 10 proceeds with the planned left turn. The system controller 34A calculates that there is a 26% chance of a first approaching vehicle 60A colliding with the vehicle 10, and thus, classifies the first approaching vehicle 60A as a medium-risk threat vehicle. The system controller 34A calculates that there is a 60% chance of a second approaching vehicle 60B colliding with the vehicle 10, and thus, classifies the second approaching vehicle 60B as a high-risk threat vehicle. The system controller 34A calculates that there is a 30% chance of a third approaching vehicle 60C colliding with the vehicle 10, and thus, classifies the third approaching vehicle 60B as a medium-risk threat vehicle. The system controller 34A calculates that there is a 6% chance of a fourth approaching vehicle 60D colliding with the vehicle 10, and thus, classifies the fourth approaching vehicle 60B as a medium-risk threat vehicle. The system controller 34A calculates that there is a 4% chance of a fifth approaching vehicle 60E colliding with the vehicle 10, and thus, does not classify the fifth approaching vehicle 60E as a threat vehicle.

For each of the identified approaching vehicles 60 that is classified by the system controller 34A as a threat vehicle (60A, 60B, 60C, 60D), the system controller 34A is further adapted to provide a warning message 70 and augmentation graphics 72 on the inner surface 66 of the windshield 68 of the vehicle by at least one of projecting the warning message 70 and augmentation graphics 72 onto the inner surface 66 of the windshield 68 with the AR-HUD system 52, and projecting the warning message 70 and augmentation graphics 72 onto the inner surface 66 of the windshield 68 with the full windshield display system 54.

Figure 4:
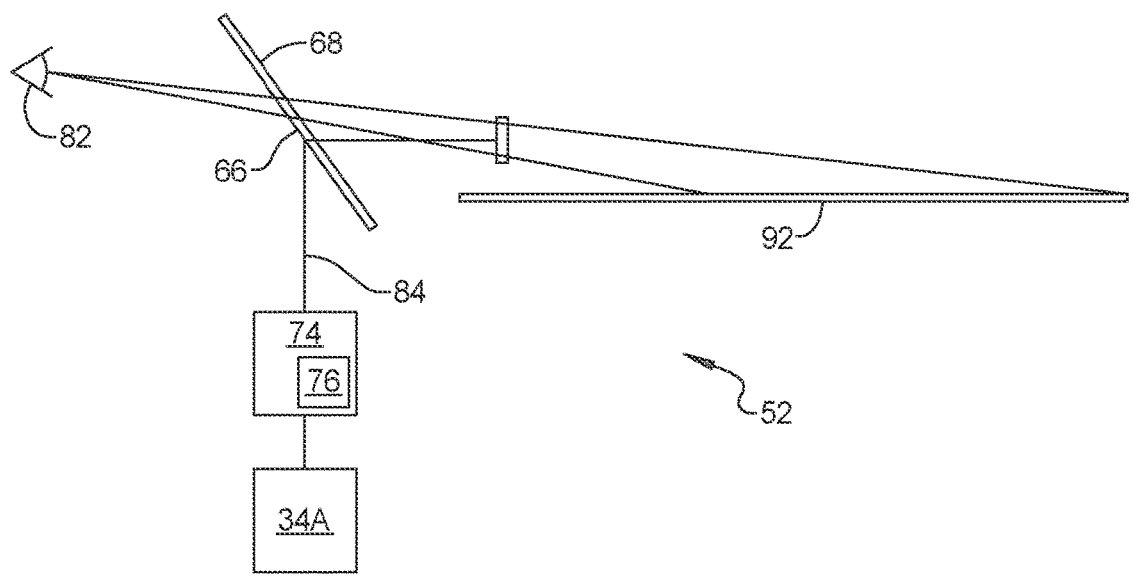
FIG. 4 is a schematic view of an augmented reality head up display system according to an exemplary embodiment.

Referring to FIG. 4, in an exemplary embodiment, the AR-HUD system 52 includes a projection module 74 including at least one light source 76 that is adapted to project an image upon the inner surface 66 of the windshield 68 of the vehicle 10. As described herein, the at least one light source 76 comprises a laser, however, it should be understood that the at least one light source 76 may be other known types of light sources used in head-up display systems. In an exemplary embodiment, the projection module 74 is a holographic projection module and includes an exit pupil replicator. The holographic image is projected into the exit pupil replicator and then propagates inside the exit pupil replicator and is extracted multiple times before being projected upward to the 66 inner surface of the windshield 68. The re-circulation of the light several times within the exit pupil replicator expands the pupil so the viewer can see the holographic image from an extended eye-box.

A spatial light modulator is positioned between the projection module 74 and the exit pupil replicator. The spatial light modulator is adapted to receive the light from the laser 76, to diffract the laser light with an encoded hologram and to deliver the diffracted laser to the exit pupil replicator. As shown and described herein, the head-up system is a holographic head-up display system, however, it should be understood that the novel features of the present disclosure are applicable to other head-up display configurations.

The driver monitoring system 50 is adapted to track a position of a driver's eyes 82. The plurality of onboard sensors 40*a*-40*n* includes at least one non-visual sensor 78 that is adapted to detect objects, such as approaching vehicles 60, within an environment surrounding the vehicle 10, and at least one image capturing device 80 adapted to capture images of the environment surrounding the vehicle 10.

The driver monitoring system 50 includes one or more sensors, such as cameras, for determining the location of a head of the driver of the vehicle 10 as well as the orientation or gaze location of the driver's eyes 82. The at least one non-visual sensor 78 includes one or more sensors that are adapted to detect a position, velocity, and direction of travel of objects in the environment surrounding the vehicle 10. By way of non-limiting examples, the at least one non-visual sensor 78 may include one or more sensors such as radar, LiDAR, and infrared sensors, however, it is to be appreciated that other sensors that employ non-visual techniques to detect the presence of objects may be used as well. The at least one image-capturing device 80 may include cameras that obtain periodic or sequential images of the environment surrounding the vehicle 10 and objects therein.

Figure 5:
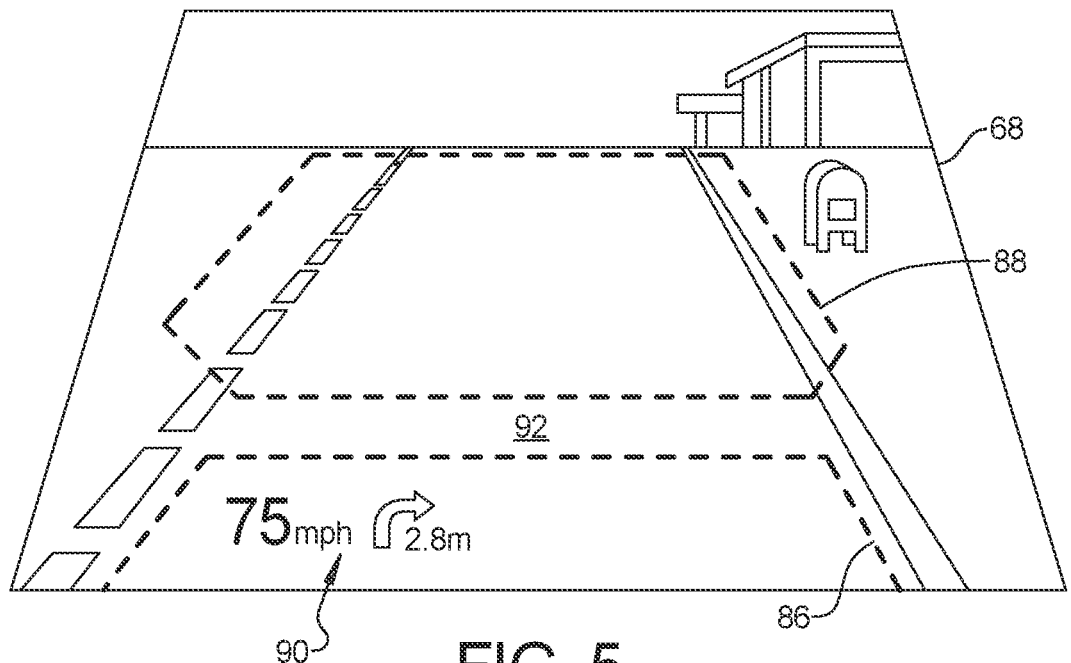
FIG. 5 is a schematic view of an inner surface of a windshield of the vehicle.

The system controller 34A is in electronic communication with the at least one laser 76, the at least one non-visual sensor 78 and the at least one image capturing device 80. The system controller 34A uses the at least one non-visual sensor 78 and the at least one image capturing device 80 to identify approaching vehicles 60. The at least one laser 76 of the holographic projection module 74 is adapted to project images upward to the inner surface 66 of the windshield 68 of the vehicle 10, as indicated by arrow 84. Referring to FIG. 5, the projection module 74 can project images that will appear to occupants within the vehicle 10 in a near image plane 86, and images that will appear to the driver in a far image plane 88. FIG. 5 is an exemplary interior view of the windshield 68, where the environment surrounding the vehicle 10 is visible through the windshield 68.

The system controller 34A instructs the projection module 74 of the augmented reality head-up display system 52 to project cluster content information 90 upon the windshield 18 within the near-field image plane 44. The cluster content information 90 informs the driver of the vehicle 10 of driving conditions such as, but not limited to, vehicle speed, speed limit, gear position, fuel level, current position, and navigational instructions. In the example as shown in FIG. 5, the cluster content information 90 includes vehicle speed and navigational directions. The system controller 34A instructs the projection module 74 to project the warning message 70 and augmentation graphics 72 upon the windshield 68 within the far image plane 88, where the warning message 70 and/or the augmentation graphics 72 are overlaid at a position upon the windshield 68 where the warning message 70 and/or the augmentation graphics 72 appear to the driver to be positioned on the roadway surface 92 in front of the vehicle 10. The far image plane 88 contains images overlaid upon the roadway 92 that are visible through the windshield 68. In the embodiment as shown in FIG. 5, the far image plane 88 only covers a portion of the entire plane of the windshield 68, however, it is to be appreciated that in another implementation the far image plane 88 may cover the entire plane of the windshield 68 that is not occupied by the near image plane 86.

Figure 6:
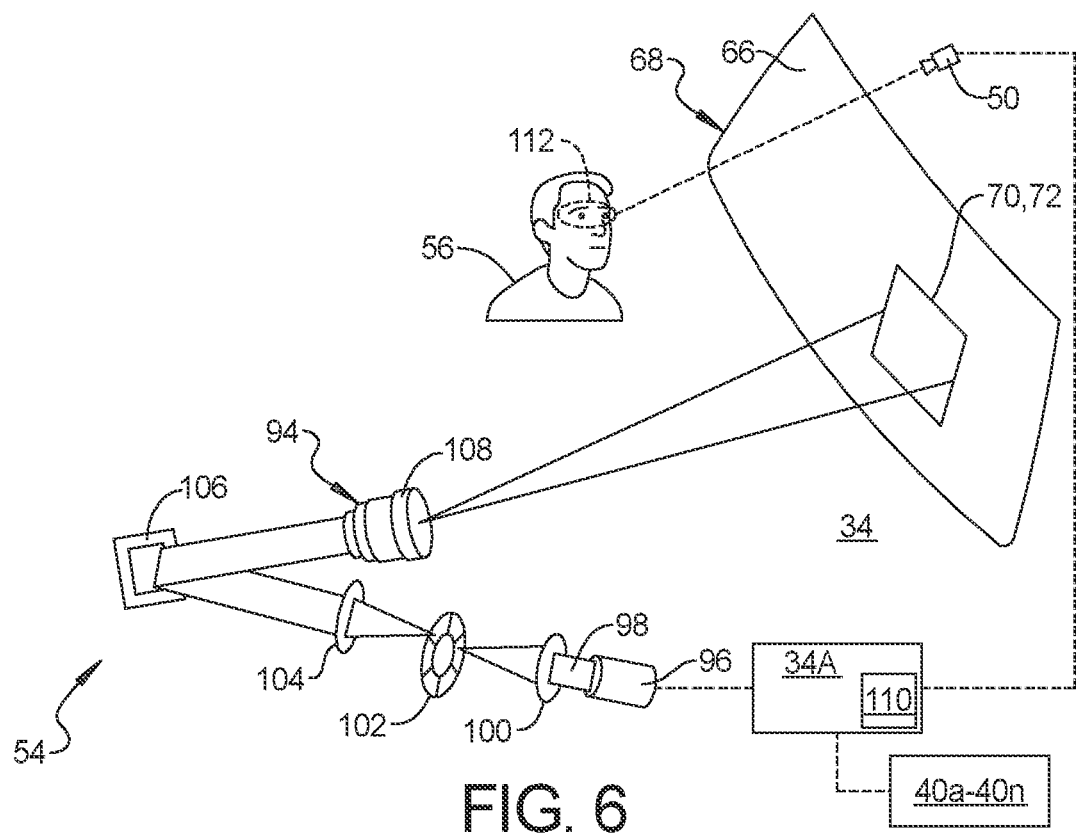
FIG. 6 is a schematic view of a full windshield display system according to an exemplary embodiment.

Referring to FIG. 6, in an exemplary embodiment, the full windshield display 54 comprises a hybrid augmented reality head up display system in communication with the system controller 34A. Other options are suitable for the full windshield display 54, such, as by way of non-limiting examples, a black-out region pepper's ghost display, fiber-optic based projection systems, micro-LED transparent displays, and holographic transparent displays. The hybrid augmented reality head up display of the exemplary embodiment described herein includes a digital light projector (DLP) 94 positioned within the vehicle 10 and adapted to project the warning message 70 and/or augmentation graphics 72 onto the inner surface 66 of the windshield 68 of the vehicle 10.

The DLP 94 is capable of projecting two-dimensional and three-dimensional images that depict objects such as pedestrians, buildings and other vehicles in the environment surrounding the vehicle 10. In an exemplary embodiment, the DLP 94 includes a light source 96 adapted to project an excitation light 98, a condensing lens 100 adapted to focus the excitation light 98 from the light source 96, a color filter 102 (color wheel) adapted to split the focused excitation light 98 into red, green and blue light, a shaping lens 104 adapted to focus the excitation light 98 passing through the color filter 102, a digital micro-mirror device (DMD) 106 adapted to re-direct the excitation light 98, and a projection lens 108 adapted to receive the excitation light 98 from the digital micro-mirror device (DMD) 106 and project the excitation light 98 to the inner surface 66 of the windshield 68.

The system controller 34A includes a DLP engine 110. The DLP engine 76 includes a programmable processor including programming to monitor various inputs and determine what information is appropriate to display. The DLP engine 110 can communicate directly with various systems and components, or the DLP engine 110 can alternatively or additionally communicate over a LAN/CAN system. The DLP engine 110 utilizes information regarding the operational environment of the vehicle 10 derived from a number of inputs. The various sensing devices 40a-40n collect and provide information. The sensing devices 40a-40n include a camera or image capturing device taking periodic or sequential images representing a view from the vehicle 10. The windshield 68 is equipped with features capable of displaying an image projected thereupon while remaining transparent or substantially transparent such that occupants 56 of the vehicle 10 can clearly observe outside of the vehicle 10 through the windshield 68. It should be understood that, as depicted, the windshield 68 is in the front of the vehicle 10, other surfaces within the vehicle 10 could be used for projection, including side windows and a rear window. Additionally, the view on the front windshield 68 could be continued upon the front vehicle "A-pillars" and onto the side windows as a continuous image.

The DLP engine 110 includes display software or programming translating requests to display information from the DLP engine 110 in graphical representations describing the information. The DLP engine 110 includes programming to compensate for the curved and tilted surface of the windshield 68 and any other surfaces onto which the warning message 70 and/or augmentation graphics 72 are to be projected. The DLP engine 110 controls the light source 96 which includes a laser or projector device producing the excitation light 98 to project the warning message 70 and/or augmentation graphics 72.

The occupant monitoring system 50 includes sensors known in the art to approximate a location of the head of the occupant (driver) 56 and further the orientation or gaze location of the eyes of the occupant 56. Based upon the output of the occupant monitoring system 50 and input data tracking location information regarding the environment around the vehicle 10, the DLP engine 110 can accurately position the warning message 70 and/or augmentation graphics 72 such that the occupant 56 sees the warning message 70 and/or augmentation graphics 72 overlaid with visual images through the windshield 68.

The occupant monitoring system 50 includes eye sensing and head sensing devices allowing estimation of eye location, allowing registration of images upon the windshield 56 such that the images correspond to a view of the occupant 56. Further, the occupant monitoring system 50 allows the system 11 to locate an occupant eye ellipse 112 position. An eye ellipse 112 is a three-dimensional graphical depiction of a multivariate normal distribution used to approximate the distribution of an occupant's 56 eye locations within the vehicle 10. The eye ellipse 112 is represented by two three-dimensional ellipses, one for the right eye and one for the left eye.

It will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 68 and the position of an occupant eye ellipse 112 position are contemplated, and the disclosure is not intended to be limited to the particular embodiments described herein.

Figure 7:
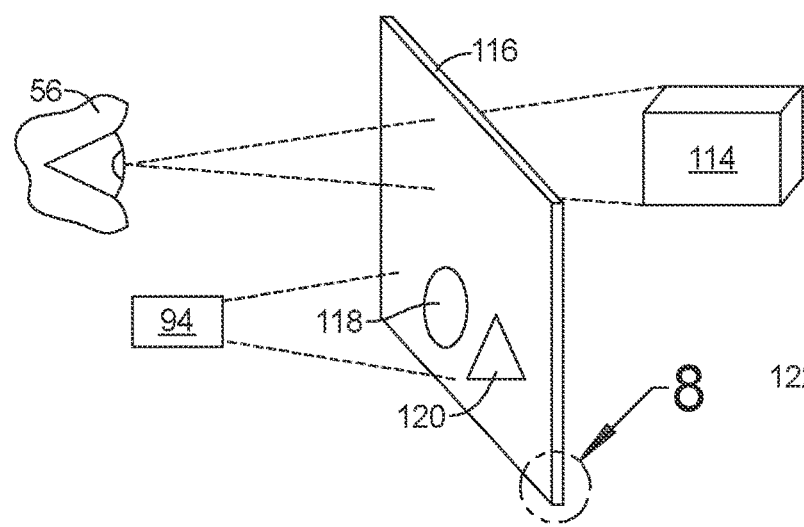
FIG. 7 is schematic illustration of a substrate for the windshield of the vehicle according to an exemplary embodiment.
Figure 8:
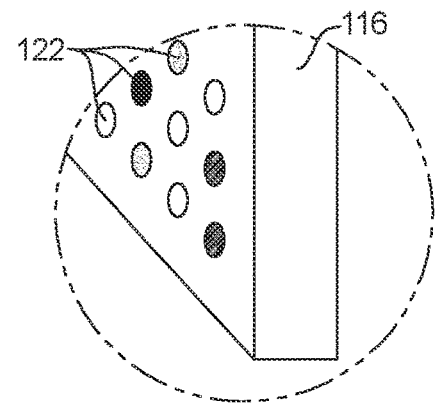
FIG. 8 is a enlarged portion of FIG. 7, as indicated by the circle labelled "FIG. 8" in FIG. 7.

The windshield 68 functions as a medium through which relevant features are observable while serving as a display device upon which the warning message 70 and/or augmentation graphics 72 may be displayed. The windshield 68 is both transparent and capable of displaying images projected by the excitation light 98. Referring to FIG. 7 and FIG. 8, an occupant 56 is able to see an arbitrary object (e.g. cube 114) through a substrate 116 positioned on the windshield 68. The substrate 116 may be transparent or substantially transparent. While the occupant 56 sees the arbitrary object 114 through the substrate 116, the occupant 56 can also see images (e.g. circle 118 and triangle 120) that are created at the substrate 116. The substrate 116 may be part of the windshield 68, a glass substrate, a plastic substrate, a polymer substrate, or other transparent (or substantially transparent) medium that would be appreciated by one of ordinary skill in the art. Other substrates may complement the substrate 116 to provide for tinting, substrate protection, light filtering (e.g. filtering external ultraviolet light), and other functions.

FIG. 8 depicts illumination of transparent displays illuminated with excitation light 98 (e.g. ultraviolet light) from a light source 96. The substrate 116 receives excitation light 98 from the light source 96. The received excitation light 98 may be absorbed by light emitting material 122 at the substrate 116. When the light emitting material 122 receives the excitation light 98, the light emitting material 122 emits visible light. Accordingly, images (e.g. circle 118 and triangle 120) may be created at the substrate 116 by selectively illuminating the substrate 116 with excitation light 98.

In an exemplary embodiment, the light emitting material 122 includes transparent phosphors that are embedded into the substrate 116. The transparent phosphors are light emitting particles which fluoresce in response to being excited by the excitation light 98. In an exemplary embodiment, the transparent phosphors are red, green, and blue (RGB) phosphors, allowing full color. The use of monochrome and/or two-color phosphors is also within the scope of the present disclosure. When excitation light 98 is absorbed by the transparent phosphors, visible light is emitted by the transparent phosphors. The excitation light 98 is provided by the light source 96. Use of the substrate 116 and light emitting material 122 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 98 may be ultraviolet light, in accordance with embodiments of the present disclosure. If the excitation light 98 is ultraviolet light, then when the light emitting material 122 emits visible light in response to the ultraviolet light, a down-conversion physical phenomenon occurs. Specifically, ultraviolet light has a shorter wavelength and higher energy than visible light. Accordingly, when the light emitting material 122 absorbs the ultraviolet light and emits lower energy visible light, the ultraviolet light is down-converted to visible light because the ultraviolet light's energy level goes down when it is converted into visible light.

As shown in FIG. 6, the excitation light 98 is output by the light source 96 of the digital light processing projector (DLP) 94. In an exemplary embodiment, the light source 96 is a micro-mirror array (MMA) projector (e.g. a digital light processing (DLP) projector 94). In the DLP 94, the warning message 70 and the augmentation graphic 72 are created by microscopically small mirrors laid out in a matrix on a semiconductor chip within the DMD 106. An MMA projector that outputs ultraviolet light may be similar to a MMA projector that outputs visible light, except that the color filter 102 has light filters that are tailored to the ultraviolet light spectrum. In other embodiments, the DLP 94 is a liquid crystal display (LCD) projector. In embodiments, the DLP 94 may be a liquid crystal on silicon (LCOS) projector. In embodiments, the DLP 94 may be an analog projector (e.g. a slide film projector or a movie film projector). One of ordinary skill in the art would appreciate other types of projectors which may be used to project ultraviolet light on the substrate 116.

In an exemplary embodiment, when providing a warning message 70 and augmentation graphics 72 onto the inner surface 66 of the windshield 68 of the vehicle 10, the system controller 34A is further adapted to determine what warning message 70 and augmentation graphics 72 are to be provided, and determine if the warning message 70 and the augmentation graphics 72 will fit within a field of view (FOV) of the AR-HUD system 52. Referring again to FIG. 5, the FOV of the AR-HUD system 52 is the area where the AR-HUD system 52 is capable of displaying images. In the example shown in FIG. 5, the far image plane 88 has a FOV that is limited to the area indicated at 88. In this example, the AR-HUD system 52 is only capable of providing images within the area indicated by the dashed lines of the far image plane 88.

If the size and nature of the warning message 70 and augmentation graphic 72 allow the warning message 70 and the augmentation graphic 72 to fit within the FOV of the AR-HUD system 72, then the system controller 34A is adapted to project the warning message 70 and augmentation graphics 72 onto the inner surface 66 of the windshield 68 with the AR-HUD system 52. If the size and nature of the warning message 70 and augmentation graphic 72 are such that the warning message 70 and augmentation graphic 72 will not fit within the FOV of the AR-HUD system 52, then the system controller 34A is adapted to project the warning message 70 and augmentation graphics 72 onto the inner surface 66 of the windshield 68 with the full windshield display system 54, as the full windshield display system 54 essentially has an unlimited FOV and can project images onto the entire windshield 68, side window 124 or rear window 126.

When providing a warning message 70 and augmentation graphics 72 onto the inner surface 66 of the windshield 68 of the vehicle 10, the system controller 34A is further adapted to provide a warning message 70 including textual information, and to provide an augmentation graphic 72 that includes at least one of trajectory arrows, highlighting of threat vehicles, and warning icons. For example, referring to FIG. 9, the vehicle 10 is sitting at an intersection and based on navigation settings, the system controller 34A knows that the vehicle 10 intends to go straight through the intersection. The system controller 34A identifies an approaching vehicle 60, and calculates, based on the speed and trajectory of the approaching vehicle 60, that there is more than a 50% chance (third pre-determined threshold) that the approaching vehicle 60 will collide with the vehicle 10 if the vehicle 10 proceeds through the intersection at this moment. Thus, the system controller 34A provides a textual warning message 70 that says "DO NOT PROCEED!" and provides an augmentation graphic 72 that includes a warning icon next to an arrow 72A indicating the intended route of the vehicle 10. Furthermore, the augmentation graphics 72 includes highlighting 72B of the approaching vehicle 60 to draw the occupant's 56 attention to the approaching vehicle 60.

Figure 9:
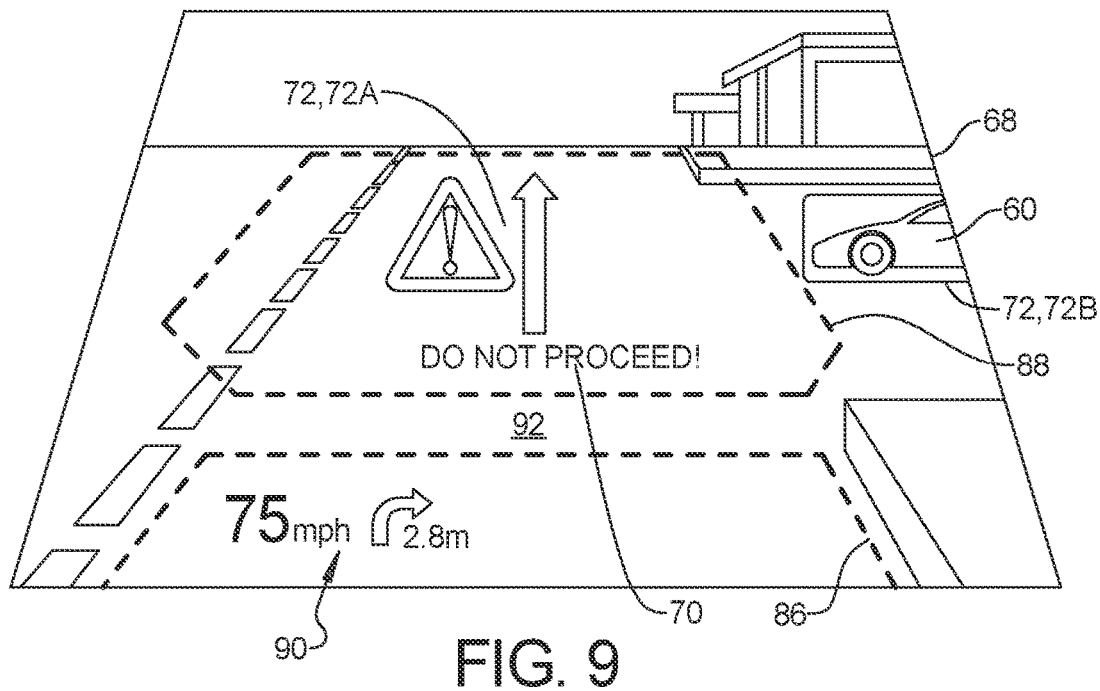
FIG. 9 is a schematic view of the inner surface of the windshield of the vehicle including a warning message to not proceed, highlighting of an approaching vehicle and a predicted route of the approaching vehicle.

In an exemplary embodiment, when determining what warning message 70 and augmentation graphics 72 are to be provided, the system controller 34A is further adapted to determine what warning message 70 and augmentation graphics 72 are to be provided for each of the at least one approaching vehicle 60 that is classified as a threat vehicle based on the classification of each threat vehicle as one of a low-risk threat vehicle, a medium risk threat vehicle or a high-risk threat vehicle. For example, as shown in FIG. 9, the calculated probability of collision is greater than 50%, thus the system controller 34A will classify the approaching vehicle 60 as a high-risk threat vehicle. Thus, the textual warning message 70 and the augmentation graphics 72, 72A, 72B in FIG. 9, are strong. Further, the textual message 70 and the augmentation graphics 72, 72A, 72B for the high-risk threat vehicle may be provided in a color, such as RED, to further relay to the occupant that there is a high risk of proceeding.

Figure 10:
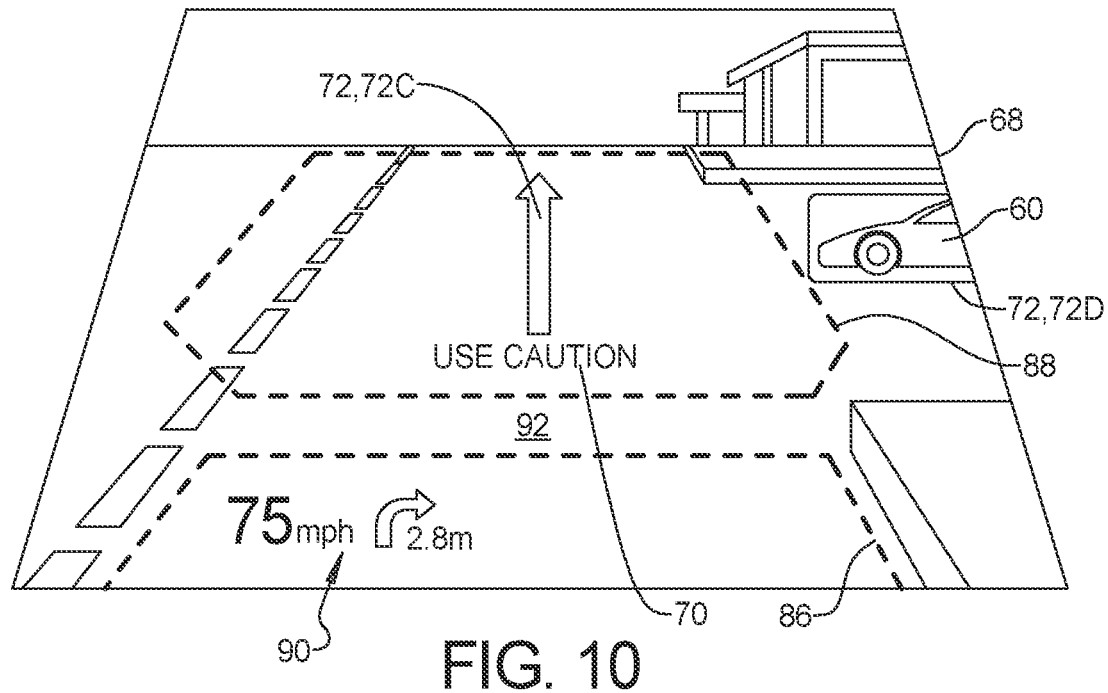
FIG. 10 is a schematic view of the inner surface of the windshield of the vehicle including a warning message to use caution, highlighting of an approaching vehicle and a suggested route of the vehicle.

Referring to FIG. 10, in another example, the calculated probability of collision is less than 10%, thus the system controller 34A will classify the approaching vehicle 60 as a low-risk threat vehicle. This could be due to circumstances such as the approaching vehicle 60 is still a long distance from the intersection and is moving very slowly, or possibly the approaching vehicle 60 is stopped at the intersection waiting to make a left turn and the vehicle 10 has the right of way. The textual warning message 70, "USE CAUTION" and the augmentation graphics 72, 72C, 72D in FIG. 10, are less strongly presented. Further, the textual message 70 and the augmentation graphics 72, 72C, 72D for the low-risk threat vehicle may be provided in a color, such as YELLOW, to relay to the occupant that there is a risk of proceeding, but less impactful that the RED message 70 and augmentation graphics 72, 72A, 72B provided for the high-risk threat vehicle shown in FIG. 9.

Figure 11:
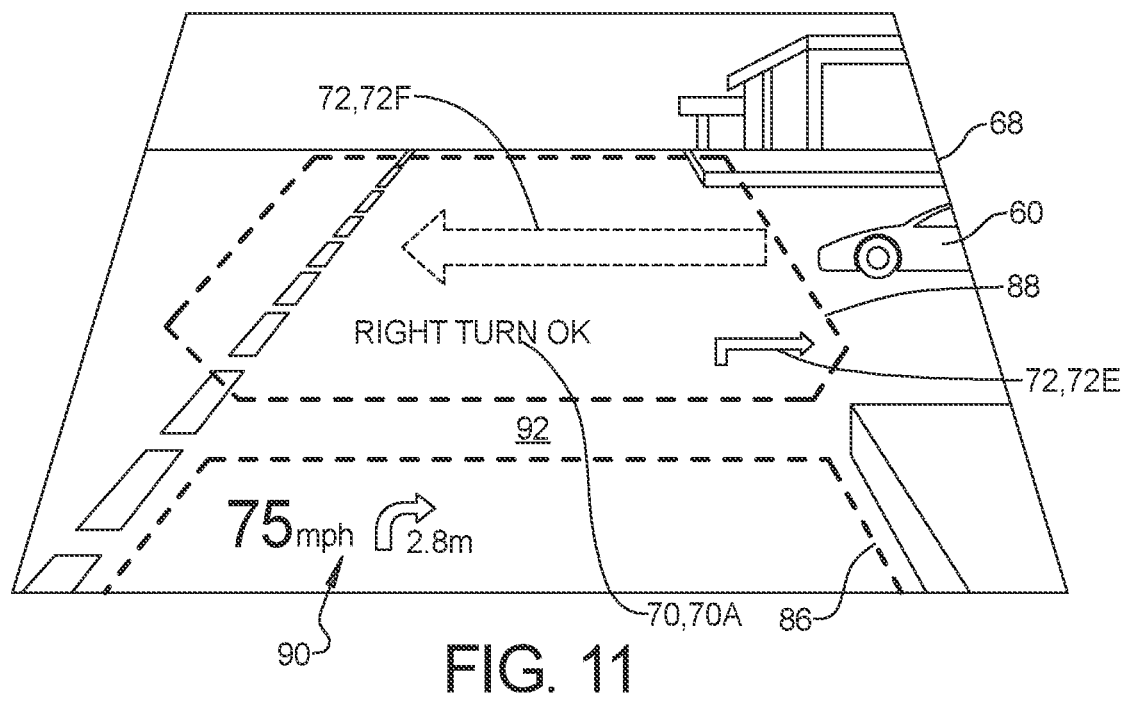
FIG. 11 is a schematic view of the inner surface of the windshield of the vehicle including a warning message indicating it is ok to proceed, a predicted route of the approaching vehicle and a suggested route of the vehicle.

Referring to FIG. 11, in another example, the calculated probability of collision is less than 2%, thus the system controller 34A will not classify the approaching vehicle 60 as a threat vehicle. The textual warning message 70 and the augmentation graphics 72 in FIG. 11, include the message "RIGHT TURN OK" 70A, and augmentation graphics 72 including a planned/suggested route arrow 72E, and a predicted approaching vehicle route arrow 72F, indicating that it is safe for the vehicle 10 to proceed with a planned right turn, as the approaching vehicle 60 does not represent a risk to that maneuver. Further, the textual message 70A and the augmentation graphics 72E, 72F provided here may be provided in a color, such as GREEN, to relay to the occupant 56 that there is little or no risk of proceeding. In other embodiments, when no threat vehicle is identified, the system controller 34A simply keeps a displayed planned/suggested route arrow 72E, or changes the color of the displayed planned/suggested route arrow 72E to green, and does not provide an explicit message instruction the driver to execute an action.

Figure 12:
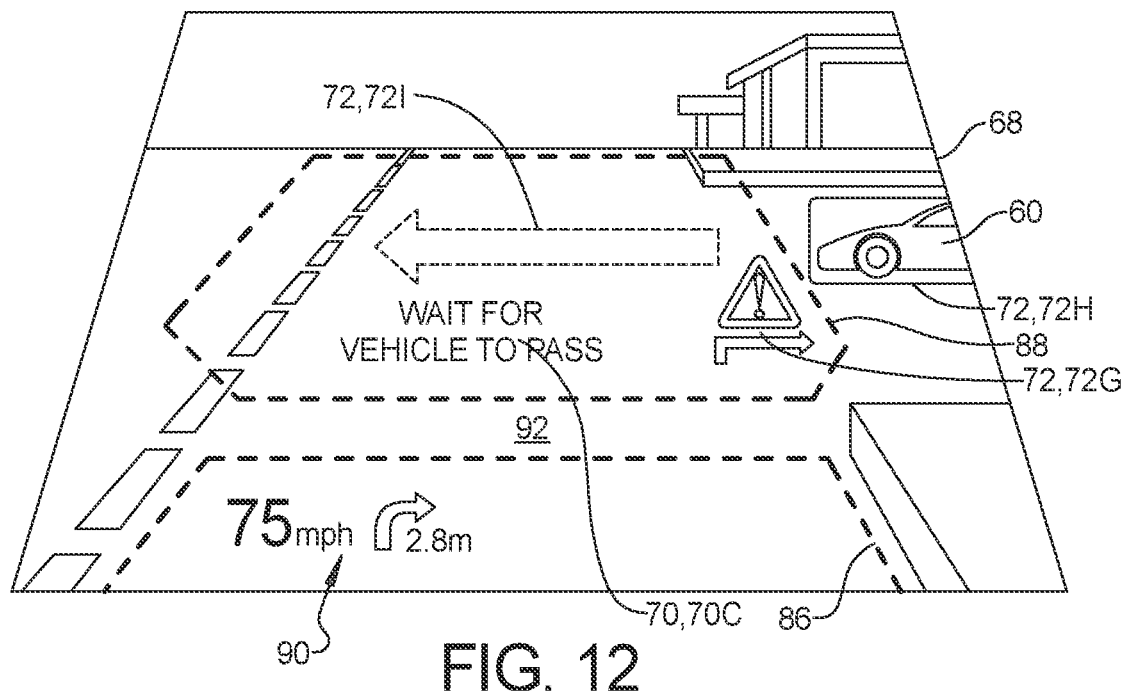
FIG. 12 is a schematic view of the inner surface of the windshield of the vehicle including a warning message indicating the vehicle should wait for the approaching vehicle to pass before proceeding, a warning icon, a predicted route of the approaching vehicle and a suggested route of the vehicle.
Figure 13:
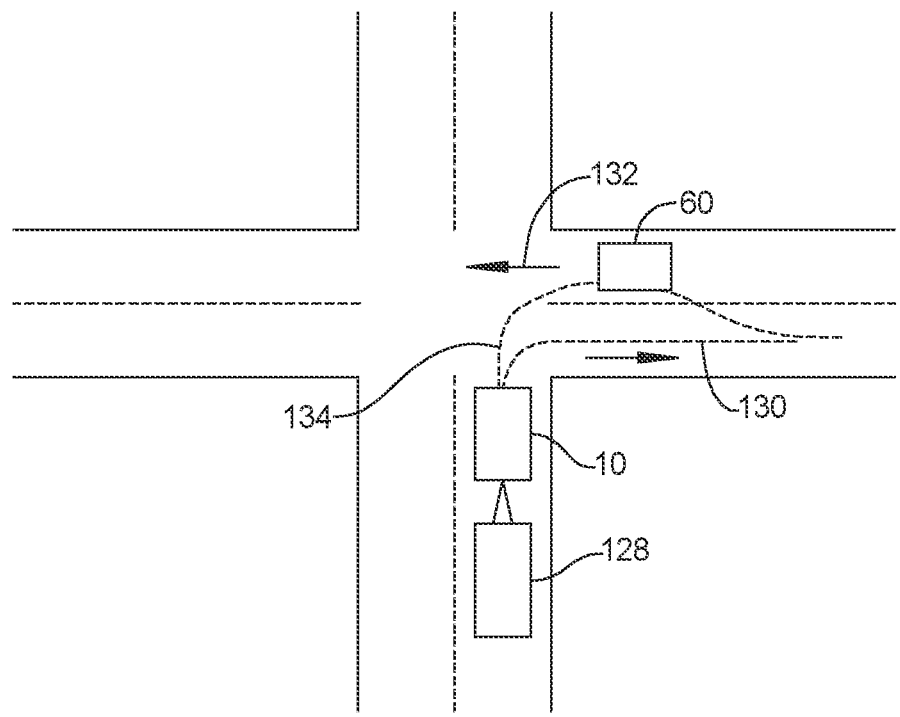
FIG. 13 is a schematic top view of an intersection illustrating a suggested route for a vehicle without a trailer compared to a suggested route for a vehicle with a trailer.

The system controller 34A will also take into consideration when the vehicle has extra length, such as a semi truck trailer combination or a vehicle 10 pulling a trailer 128. Referring to FIG. 12, in the same scenario shown in FIG. 11, with the approaching vehicle 60 in the far right lane coming from the right, the system controller 34A does not identify the approaching vehicle 60 as a threat vehicle because the predicted route for the vehicle 10, as shown at 130 in FIG. 13, will not intersect with a predicted route 132 of the approaching vehicle 60. However, if the vehicle 10 is pulling a trailer 128, due to the extra length, the vehicle 10 will need to make a wide right turn, as indicated at 134 in FIG. 13, which may intersect the predicted path 132 of the approaching vehicle 60. In this circumstance, the system controller 34A identifies and classifies the approaching vehicle 60 as a high-risk threat vehicle for the planned maneuver of the vehicle 10 pulling a trailer 128 and provides a textual warning message 70C "WAIT FOR VEHICLE TO PASS" and the augmentation graphics 72 include a warning icon next to the right turn arrow 72G, as well as highlighting 72H the approaching vehicle 60 and a predicted route 72I of the approaching vehicle 60. Further, the textual message 70C and the augmentation graphics 72G, 72H, 72I for the high-risk threat vehicle may be provided in a color, such as RED, to further relay to the occupant 56 that there is a high risk of proceeding.

Referring again to FIG. 11 and FIG. 12, in another exemplary embodiment, when determining what warning message 70 and augmentation graphics 72 are to be provided, the system controller 34A is further adapted to predict, with the machine learning algorithm 62, a route 72F, 72I for each of the at least one approaching vehicle that is classified as a threat vehicle, and when providing the warning message 70 and augmentation graphics 72, the system controller 34A is further adapted to project augmentation graphics 72 including the predicted route 72F, 72I for each of the at least one approaching vehicle 60 that is classified as a threat vehicle onto the inner surface 66 of the windshield 68 of the vehicle 10 with the full windshield display 54.

In another exemplary embodiment, when determining what warning message 70 and augmentation graphics 72 are to be provided, the system controller 34A is further adapted to calculate, with the machine learning algorithm, a suggested route 72E for the vehicle 10. The suggested route provides a route, based on the nature of the roadway and the environment and the presence of any approaching vehicles 60, wherein, if any approaching vehicles 60 are present, the probability that any of the at least one approaching vehicle 60 will collide with the vehicle 10, if the vehicle 10 follows the suggested route 72E, is less than the first pre-determined threshold, and when providing the warning message 70 and augmentation graphics 72 onto the inner surface 66 of the windshield 68 of the vehicle 10, the system controller 34A is further adapted to project augmentation graphics 72 including the suggested route 72E for the vehicle 10 onto the inner surface 66 of the windshield 68 of the vehicle 10 with the full windshield display 54.

Figure 14A:
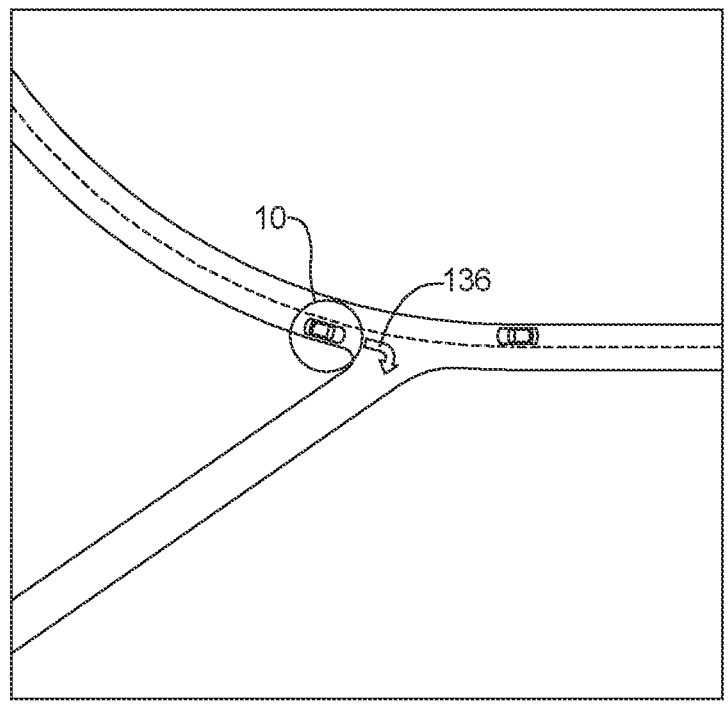
FIG. 14A is a schematic top view of a vehicle approaching a sharp right turn.
Figure 14B:
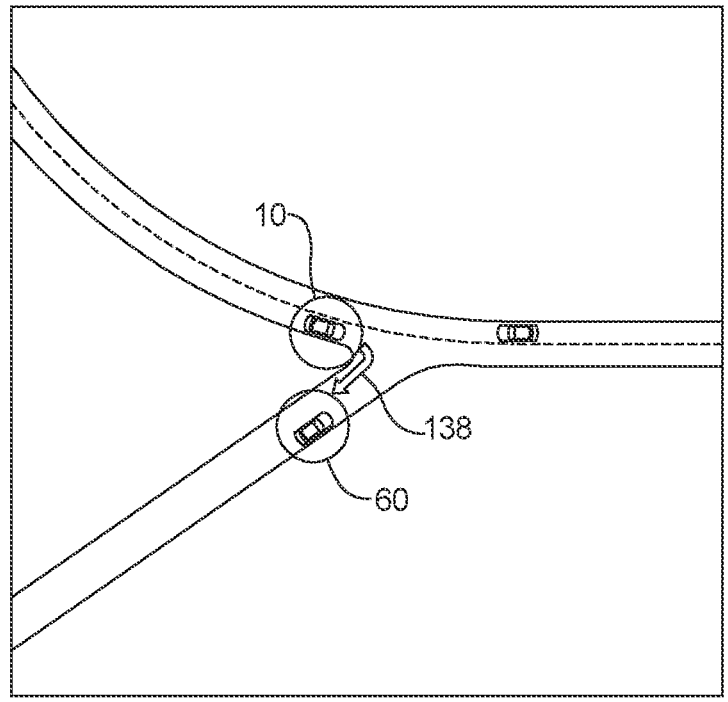
FIG. 14B is the schematic top view shown in FIG. 14A, wherein an approaching vehicle is present.

For example, referring to FIG. 14A, the vehicle 10 approaches a sharp right turn, wherein many times vehicles making such sharp turns are prone to miscalculate required steering for the maneuver and will hit roadway edges. The system controller 34A using crowd sourced telemetry information and data from the database 64/machine learning algorithm 62 can plan a nominal path 136, that will take the vehicle 10 on a wide enough turn path to avoid hitting roadway edges and provide warning message 70 and/or augmentation graphics 72 to illustrate the nominal path 136 to the occupant 56 within the vehicle 10, and provide a warning message 70 and/or augmentation graphics 72 when the system controller 34A detects that the vehicle 10 is straying from the nominal path 136. Referring to FIG. 14B, the presence of an approaching vehicle 60 which may be classified as a threat vehicle 60 will cause the system controller 34A to alter the nominal path to reduce the threat risk. The vehicle 10, and possibly the threat vehicle 60 as well, may receive a warning message 70 of the possible conflict, and augmentation graphics 72 illustrating an altered route 138 to reduce the risk of conflict.

Referring again to the scenario described above wherein the vehicle 10 is pulling a trailer 128. When approaching the sharp turn shown in FIG. 14A and FIG. 14B, the system controller 34A, taking into consideration the extra length of the vehicle 10 and trailer 128 may determine that the vehicle 10 and trailer 128 can only successfully make the sharp right turn by taking a very wide radius path, and such path may be impossible with the presence of the approaching vehicle 60. In this circumstance, rather than provide an altered route 138, the system controller 34A provides a warning message 70 indicating that the vehicle 10 should stop, and wait to make the sharp right turn until after the approaching vehicle 60 has passed.

In another exemplary embodiment, the system controller 34A is further adapted to provide a secondary warning message 170 and secondary augmentation graphics 172 onto an inner surface of at least one of a side window 124 of the vehicle 10 and a rear window 126 of the vehicle 10 by projecting the secondary warning message 170 and secondary augmentation graphics 172 onto the inner surface of at least one of the side window 124 of the vehicle 10 and the rear window 126 of the vehicle 10 with the full windshield display system 54. The full windshield display system 54 described above can be used to excite phosphors within the side window 124 and rear window 126 of the vehicle 10 which are visible to entities outside the vehicle 10 as well as occupants 56 within the vehicle 10. Thus, the full windshield display system 54 can be used to present a warning message 170 and/or augmentation graphics 172 to nearby or adjacent vehicles to communicate information related to an intended route of the vehicle 10.

Figure 15A:
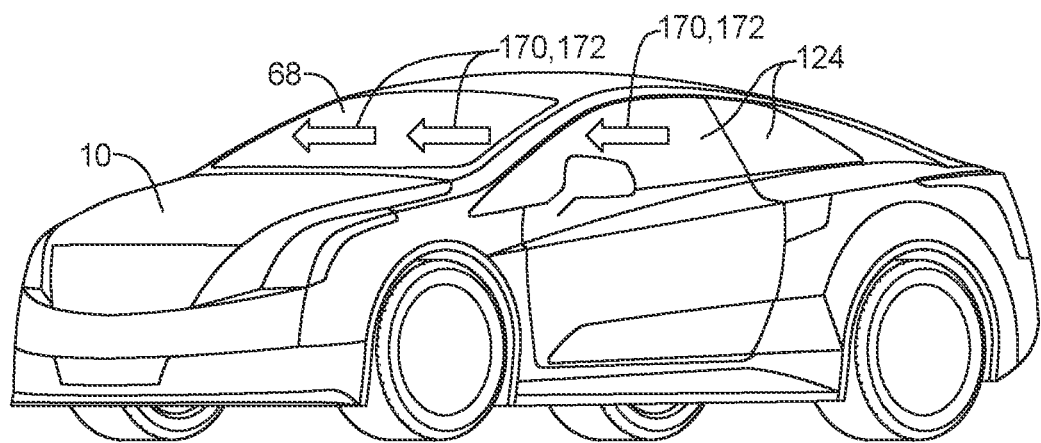
FIG. 15A is perspective view of a vehicle having arrows displayed externally on the front windshield and side window.
Figure 15B:
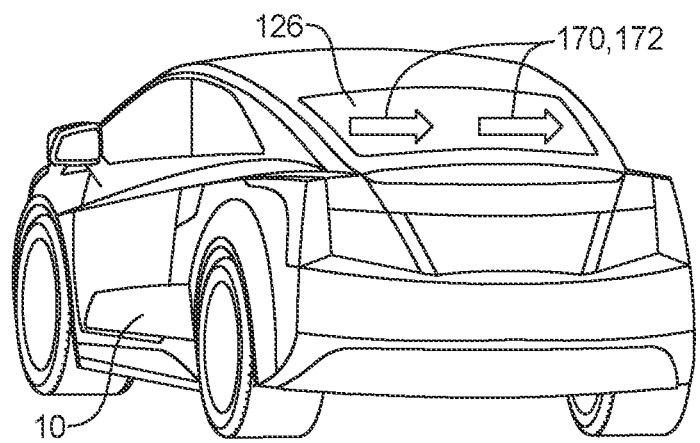
FIG. 15B is a perspective view of a vehicle having arrows displayed externally on a rear window.

Referring to FIG. 15A, the full windshield display 54 presents arrows 172A on the front windshield 68 and the side window 124 to provide information on the intended route of the vehicle 10 in situations where there may be confusion, such as at busy intersections or round-abouts and when there is no line of sight of approaching vehicles 60, wherein, information about such approaching vehicles 60 is provided via wireless communications with infrastructure and other vehicles. Referring to FIG. 15B, the full windshield display 54 presents arrows 170, 172 on the rear window 126 to provide backing guidance or threat awareness to nearby vehicles.

The system controller 34A includes a graphical processor which processes information from the system controller 34A and determines an appropriate warning message 70, 170 and/or augmentation graphics 72, 172 to overlay onto the image displayed onto the windshield 68, side window 124 or rear window 126 for the occupant 56 or external entities.

Figure 16:
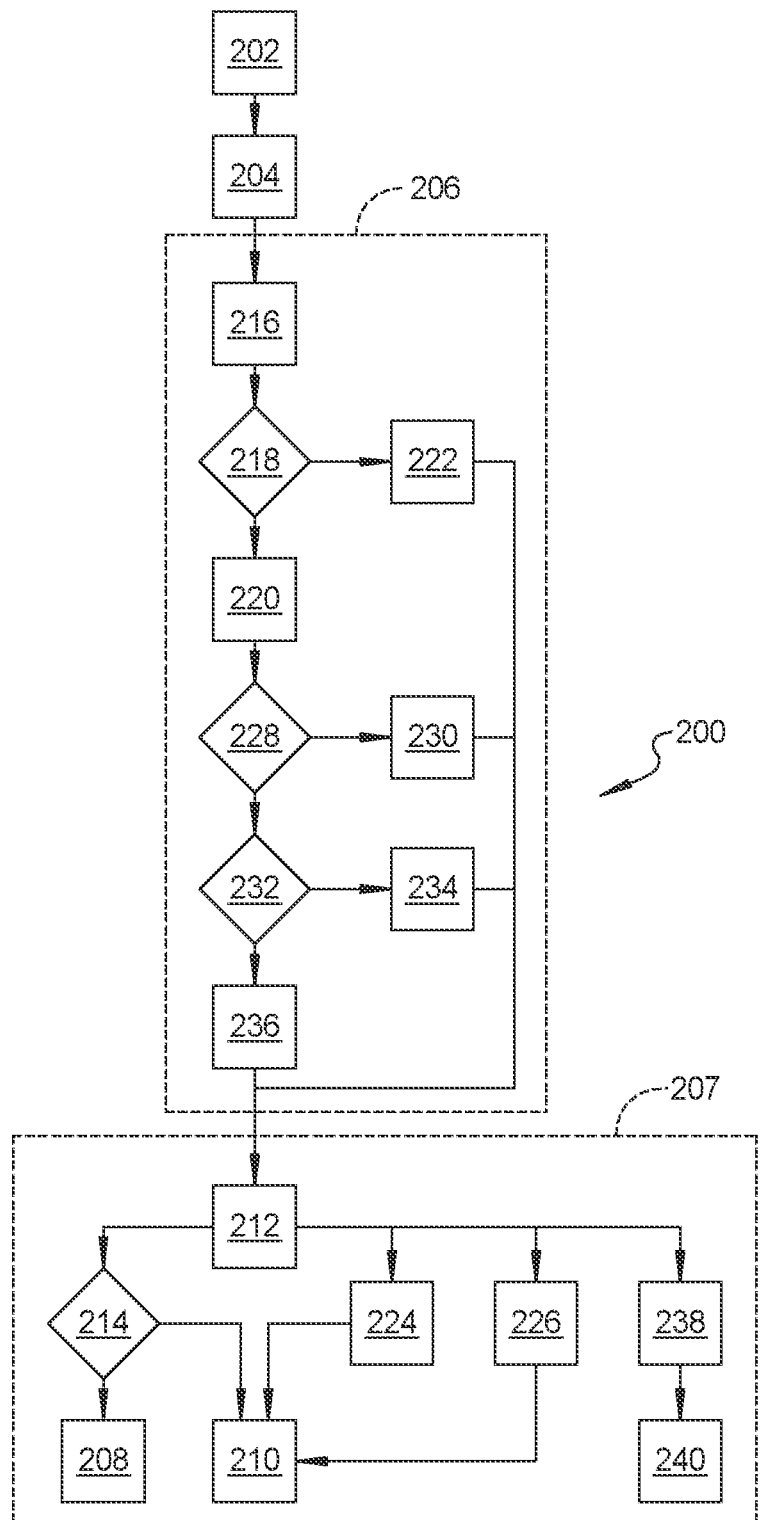
FIG. 16 is a flow chart illustrating a method of providing warnings to an occupant within a vehicle to inform the occupant of threat vehicles when the vehicle is located at an intersection according to an exemplary embodiment.

Referring to FIG. 16, a method 200 of providing an alert to an occupant 56 within a vehicle 10 to inform the occupant 56 of threat vehicles 60 when the vehicle 10 is located at an intersection includes, beginning at block 202, detecting, with a system controller 34A in communication with a plurality of onboard sensors 40a-40n, wireless communication with other vehicles and wireless communication with infrastructure systems 58, at least one approaching vehicle 60 that is moving toward the intersection, moving to block 204, calculating, with the system controller 34A, a distance from the intersection, speed and trajectory of the at least one approaching vehicle 60, moving to block 206, determining, with the system controller 34A, if the at least one approaching vehicle 60 poses a threat and if the at least one approaching vehicle 60 poses a threat, classifying the at least one approaching vehicle 60 as a threat vehicle, and moving to block 207, providing a warning message 70 and augmentation graphics 72 onto an inner surface 66 of a windshield 68 of the vehicle 10 by at least one of, moving to block 208, projecting the warning message 70 and augmentation graphics 72 onto the inner surface 66 of the windshield 68 with an augmented reality head up display system (AR-HUD) 52, and, moving to block 210, projecting the warning message 70 and augmentation graphics 72 onto the inner surface 66 of the windshield 68 with a full windshield display system 54.

In an exemplary embodiment, the providing a warning message 70 and augmentation graphics 72 onto an inner surface 66 of a windshield 68 of the vehicle 10 further includes, moving to block 212, determining, with the system controller 34A, the warning message 70 and the augmentation graphics 72 to be provided, moving to block 214, determining, with the system controller 34A, if the warning message 70 and the augmentation graphics 72 will fit within a field of view (FOV) 88 of the AR-HUD system 52, and, moving to block 208, projecting the warning message 70 and augmentation graphics 72 onto the inner surface 66 of the windshield 68 with the AR-HUD system 52 when the warning message 70 and the augmentation graphics 72 fit within the FOV 88 of the AR-HUD system 52, and, moving to block 210, projecting the warning message 70 and augmentation graphics 72 onto the inner surface 66 of the windshield 68 with the full windshield display system 54 when the warning message 70 and the augmentation graphics 72 do not fit within the FOV 88 of the AR-HUD system 52.

In another exemplary embodiment, the determining, with the system controller 34A, if the at least one approaching vehicle 60 poses a threat and if the at least one approaching vehicle 60 poses a threat, classifying the at least one approaching vehicle 60 as a threat vehicle at block 206 further includes, moving to block 216, calculating, with a machine learning algorithm 62, a probability that the at least one approaching vehicle 60 will collide with the vehicle 10, and, moving to block 220, classifying the at least one approaching vehicle 60 as a threat vehicle when the probability that the at least one approaching vehicle 60 will collide with the vehicle 10 exceeds a first pre-determined threshold at block 218, and, moving to block 222, not classifying the approaching vehicle 60 as a threat vehicle if the probability that the at least one approaching vehicle 60 will collide with the vehicle 10 does not exceed the first pre-determined threshold at block 218.

In an exemplary embodiment, the providing a warning message 70 and augmentation graphics 72 onto an inner surface 66 of a windshield 68 of the vehicle 10 at block 207 further includes providing a warning message 70 including textual information, and providing augmentation graphics 72 that includes at least one of trajectory arrows, highlighting of threat vehicles, and warning icons.

In an exemplary embodiment, the determining, with the system controller 34A, the warning message 70 and the augmentation graphics 72 to be provided at block 212 further includes, moving to block 224, predicting, with the machine learning algorithm 62, a route for each of the at least one approaching vehicle 60 that is classified as a threat vehicle, and the providing a warning message 70 and augmentation graphics 72 onto an inner surface 66 of a windshield 68 of the vehicle 10 with the full windshield display 54 at block 210, further includes projecting augmentation graphics 72 including the predicted route for each of the at least one approaching vehicle 60 that is classified as a threat vehicle onto the inner surface 66 of the windshield 68 of the vehicle 10 with the full windshield display 54.

In another exemplary embodiment, the determining, with the system controller 34A, the warning message 70 and the augmentation graphics 72 to be provided at block 212, further includes, moving to block 226, calculating, with the system controller 34A and the machine learning algorithm 62, a suggested route 72E for the vehicle 10, wherein the probability that any of the at least one approaching vehicle 60 that is classified as a threat vehicle will collide with the vehicle 10, if the vehicle 10 follows the suggested route 72E, is less than the first pre-determined threshold, and, the providing a warning message 70 and augmentation graphics 72 onto an inner surface 66 of a windshield 68 of the vehicle 10 with the full windshield display 54 at block 210 further includes projecting augmentation graphics 72 including the suggested route 72E for the vehicle 10 onto the inner surface 66 of the windshield 68 of the vehicle 10 with the full windshield display 54.

In an exemplary embodiment, the classifying the at least one approaching vehicle 60 as a threat vehicle at block 220 when the probability that the at least one approaching vehicle 10 will collide with the vehicle 10 exceeds a first pre-determined threshold at block 218 further includes, moving to block 230, classifying the at least one approaching vehicle 10 as a low-risk threat vehicle when the probability that the at least one approaching vehicle 60 will collide with the vehicle 10 exceeds the first pre-determined threshold at block 218, and does not exceed a second pre-determined threshold at block 228, and, moving to block 234, classifying the at least one approaching vehicle 60 as a medium-risk threat vehicle when the probability that the at least one approaching vehicle 60 will collide with the vehicle 10 exceeds the second pre-determined threshold at block 228, and does not exceed a third pre-determined threshold at block 232, and, moving to block 236, classifying the at least one approaching vehicle 60 as a high-risk threat vehicle when the probability that the at least one approaching vehicle 60 will collide with the vehicle 10 exceeds the third pre-determined threshold at block 232.

In an exemplary embodiment, the determining, with the system controller 34A, the warning message 70 and the augmentation graphics 72 to be provided at block 212 further includes determining, with the system controller 34A, the warning message 70 and the augmentation graphics 72 to be provided for each of the at least one approaching vehicle 60 that is classified as a threat vehicle based on the classification of each threat vehicle as one of a low-risk threat vehicle, a medium risk threat vehicle or a high-risk threat vehicle.

In an exemplary embodiment, the method 200 further includes, moving from block 212 to block 238, providing a secondary warning message 170 and secondary augmentation graphics 172 onto an inner surface of at least one of a side window 124 of the vehicle 10 and a rear window 126 of the vehicle 10 by projecting the secondary warning message 170 and secondary augmentation graphics 172 onto the inner surface of at least one of the side window 124 of the vehicle 10 and the rear window 126 of the vehicle 10 with the full windshield display system 54.

In another exemplary embodiment, the method 200 further includes, moving from block 238 to block 240, providing information related to an intended route of the vehicle 10 to entities outside the vehicle 10 by projecting the information related to an intended route of the vehicle 10 onto the inner surface of at least one of the side window 124 of the vehicle 10 and the rear window 126 of the vehicle 10 with the full windshield display system 54.

A system and method of the present disclosure offers the advantage of providing a warning to an occupant within a vehicle to the presence of threat vehicle when the vehicle is located at an intersection and providing guidance on proceeding with planned maneuvers base on a risk level of identified threat vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing an alert to an occupant within a vehicle to inform the occupant of threat vehicles when the vehicle is located at an intersection, comprising:
    detecting, with a system controller in communication with at least one of a plurality of onboard sensors, wireless communication with other vehicles and wireless communication with infrastructure systems, at least one approaching vehicle that is moving toward the intersection;
    calculating, with the system controller, a distance from the intersection, speed and trajectory of the at least one approaching vehicle;
    determining, with the system controller, if the at least one approaching vehicle poses a threat and if the at least one approaching vehicle poses a threat, classifying the at least one approaching vehicle as a threat vehicle;
    determining, with the system controller, a warning message and augmentation graphics to be provided;
    determining, with the system controller, if the warning message and the augmentation graphics will fit within a field of view (FOV) of an augmented reality head up display system (AR-HUD);
    projecting the warning message and the augmentation graphics onto an inner surface of a windshield of the vehicle by at least one of:

projecting the warning message and augmentation graphics onto the inner surface of the windshield with the AR-HUD system when the warning message and the augmentation graphics fit within the FOV of the AR-HUD system;

changing a color of route guidance graphics currently being displayed by the AR-HUD; and projecting the warning message and augmentation graphics onto the inner surface of the windshield with a full windshield display system when the warning message and the augmentation graphics do not fit within the FOV of the AR-HUD system.

2. The method of claim 1, wherein the determining, with the system controller, if the at least one approaching vehicle poses a threat and if the at least one approaching vehicle poses a threat, classifying the at least one approaching vehicle as a threat vehicle further includes:

calculating, with a machine learning algorithm, a probability that the at least one approaching vehicle will collide with the vehicle; and classifying the at least one approaching vehicle as a threat vehicle when the probability that the at least one approaching vehicle will collide with the vehicle exceeds a first pre-determined threshold.

3. The method of claim 2, wherein the providing a warning message and augmentation graphics onto an inner surface of a windshield of the vehicle further includes:

providing a warning message including textual information; and providing augmentation graphics that includes at least one of:
  trajectory arrows;
  highlighting of threat vehicles; and
  warning icons.

4. The method of claim 2, wherein the determining, with the system controller, the warning message and the augmentation graphics to be provided further includes predicting, with the machine learning algorithm, a route for each of the at least one approaching vehicle that is classified as a threat vehicle; and the providing a warning message and augmentation graphics onto an inner surface of a windshield of the vehicle further includes projecting augmentation graphics including the predicted route for each of the at least one approaching vehicle that is classified as a threat vehicle onto the inner surface of the windshield of the vehicle with the full windshield display.

5. The method of claim 2, wherein the determining, with the system controller, the warning message and the augmentation graphics to be provided further includes calculating, with the system controller and the machine learning algorithm, a suggested route for the vehicle, wherein the probability that any of the at least one approaching vehicle that is classified as a threat vehicle will collide with the vehicle, if the vehicle follows the suggested route, is less than the pre-determined threshold; and the providing a warning message and augmentation graphics onto an inner surface of a windshield of the vehicle further includes projecting augmentation graphics including the suggested route for the vehicle onto the inner surface of the windshield of the vehicle with the full windshield display.

6. The method of claim 2, wherein the classifying the at least one approaching vehicle as a threat vehicle when the probability that the at least one approaching vehicle will collide with the vehicle exceeds a first pre-determined threshold further includes classifying the at least one approaching vehicle as a low-risk threat vehicle when the probability that the at least one approaching vehicle will collide with the vehicle exceeds the first pre-determined threshold.

7. The method of claim 6, wherein the classifying the at least one approaching vehicle as a threat vehicle when the probability that the at least one approaching vehicle will collide with the vehicle exceeds a first pre-determined threshold further includes classifying the at least one approaching vehicle as a medium-risk threat vehicle when the probability that the at least one approaching vehicle will collide with the vehicle exceeds a second pre-determined threshold.

8. The method of claim 7, wherein the classifying the at least one approaching vehicle as a threat vehicle when the probability that the at least one approaching vehicle will collide with the vehicle exceeds a first pre-determined threshold further includes classifying the at least one approaching vehicle as a high-risk threat vehicle when the probability that the at least one approaching vehicle will collide with the vehicle exceeds a third pre-determined threshold.

9. The method of claim 8, wherein the determining, with the system controller, the warning message and the augmentation graphics to be provided further includes determining, with the system controller, the warning message and the augmentation graphics to be provided for each of the at least one approaching vehicle that is classified as a threat vehicle based on the classification of each threat vehicle as one of a low-risk threat vehicle, a medium risk threat vehicle or a high-risk threat vehicle.

10. The method of claim 2, further including providing a secondary warning message and secondary augmentation graphics onto an inner surface of at least one of a side window of the vehicle and a rear window of the vehicle by projecting the secondary warning message and secondary augmentation graphics onto the inner surface of at least one of the side window of the vehicle and the rear window of the vehicle with the full windshield display system.

11. The method of claim 10, further including providing information related to an intended route of the vehicle to entities outside the vehicle by projecting the information related to an intended route of the vehicle onto the inner surface of at least one of the side window of the vehicle and the rear window of the vehicle with the full windshield display system.

12. A system for providing an alert to an occupant within a vehicle to inform the occupant of threat vehicles when the vehicle is located at an intersection, comprising:

a system controller in communication with a plurality of onboard sensors and having a wireless communication module adapted to allow the system controller to communicate with other vehicles and infrastructure systems;

an augmented reality head up display system (AR-HUD) in communication with the system controller and adapted to project images onto an inner surface of a windshield of the vehicle; and a full windshield display system adapted to project images onto the inner surface of the windshield of the vehicle;

the system controller adapted to:

detect, via communication with the plurality of onboard sensors and wireless communication, via the wireless communication module, with other vehicles and infrastructure systems, at least one approaching vehicle that is moving toward the intersection;

calculate a distance from the intersection, speed and trajectory of the at least one approaching vehicle;

determine if the at least one approaching vehicle poses a threat and if the at least one approaching vehicle poses a threat, classify the at least one approaching vehicle as a threat vehicle;

determine what warning message and augmentation graphics are to be provided;

determine if the warning message and the augmentation graphics will fit within a field of view (FOV) of the AR-HUD system;

provide a warning message and augmentation graphics onto the inner surface of the windshield of the vehicle by at least one of:

project the warning message and augmentation graphics onto the inner surface of the windshield with the AR-HUD system when the warning message and the augmentation graphics fit within the FOV of the AR-HUD system;

change a color of route guidance graphics currently being displayed by the AR-HUD; and project the warning message and augmentation graphics onto the inner surface of the windshield with the full windshield display system when the warning message and the augmentation graphics do not fit within the FOV of the AR-HUD system.

13. The system of claim 12, wherein, when determining if the approaching vehicle poses a threat and if the at least one approaching vehicle poses a threat, classifying the at least one approaching vehicle as a threat vehicle, the system controller is further adapted to:

calculate, with a machine learning algorithm, a probability that the at least one approaching vehicle will collide with the vehicle; and classify the at least one approaching vehicle as a threat vehicle when the probability that the at least one approaching vehicle will collide with the vehicle exceeds a first pre-determined threshold.

14. The system of claim 13, wherein when providing a warning message and augmentation graphics onto the inner surface of the windshield of the vehicle, the system controller is further adapted to:

provide a warning message including textual information; and provide augmentation graphics that includes at least one of:
trajectory arrows;
highlighting of threat vehicles; and
warning icons.

15. The system of claim 13, wherein when determining what warning message and augmentation graphics are to be provided, the system controller is further adapted to predict, with the machine learning algorithm, a route for each of the at least one approaching vehicle that is classified as a threat vehicle; and when providing a warning message and augmentation graphics onto the inner surface of the windshield of the vehicle, the system controller is further adapted to project augmentation graphics including the predicted route for each of the at least one approaching vehicle that is classified as a threat vehicle onto the inner surface of the windshield of the vehicle with the full windshield display.

16. The system of claim 13, wherein when determining what warning message and augmentation graphics are to be provided, the system controller is further adapted to calculate, with the machine learning algorithm, a suggested route for the vehicle, wherein the probability that any of the at least one approaching vehicle that is classified as a threat vehicle will collide with the vehicle, if the vehicle follows the suggested route, is less than the pre-determined threshold; and when providing the warning message and augmentation graphics onto the inner surface of the windshield of the vehicle, the system controller is further adapted to project augmentation graphics including the suggested route for the vehicle onto the inner surface of the windshield of the vehicle with the full windshield display.

17. The system of claim 13, wherein when classifying the at least one approaching vehicle as a threat vehicle when the probability that the at least one approaching vehicle will collide with the vehicle exceeds a first pre-determined threshold, the system controller is further adapted to:

classify the at least one approaching vehicle as a low-risk threat vehicle when the probability that the at least one approaching vehicle will collide with the vehicle exceeds the first pre-determined threshold;

classify the at least one approaching vehicle as a medium-risk threat vehicle when the probability that the at least one approaching vehicle will collide with the vehicle exceeds a second pre-determined threshold; and classify the at least one approaching vehicle as a high-risk threat vehicle when the probability that the at least one approaching vehicle will collide with the vehicle exceeds a third pre-determined threshold; and when determining what warning message and augmentation graphics are to be provided, the system controller is further adapted to determine what warning message and augmentation graphics are to be provided for each of the at least one approaching vehicle that is classified as a threat vehicle based on the classification of each threat vehicle as one of a low-risk threat vehicle, a medium risk threat vehicle or a high-risk threat vehicle.

18. The system of claim 13, wherein the system controller is further adapted to provide a secondary warning message and secondary augmentation graphics onto an inner surface of at least one of a side window of the vehicle and a rear window of the vehicle by projecting the secondary warning message and secondary augmentation graphics onto the inner surface of at least one of the side window of the vehicle and the rear window of the vehicle with the full windshield display system.

19. The system of claim 18, wherein the system controller is further adapted to provide information related to an intended route of the vehicle to entities outside the vehicle by projecting the information related to an intended route of the vehicle onto the inner surface of at least one of the side window of the vehicle and the rear window of the vehicle with the full windshield display system.

20. A vehicle having a system for providing an alert to an occupant within the vehicle to inform the occupant of threat vehicles when the vehicle is located at an intersection, comprising:

a system controller in communication with a plurality of onboard sensors and having a wireless communication module adapted to allow the system controller to communicate with other vehicles and infrastructure systems;

an augmented reality head up display system (AR-HUD) in communication with the system controller and adapted to project images onto an inner surface of a windshield of the vehicle; and a full windshield display system adapted to project images onto the inner surface of the windshield of the vehicle;

the system controller adapted to:

detect, via communication with the plurality of onboard sensors and wireless communication, via the wireless communication module, with other vehicles and infrastructure systems, at least one approaching vehicle that is moving toward the intersection;

calculate a distance from the intersection, speed and trajectory of the at least one approaching vehicle;

calculate, with a machine learning algorithm, a probability that the at least one approaching vehicle will collide with the vehicle;

classify the at least one approaching vehicle as a low-risk threat vehicle when the probability that the at least one approaching vehicle will collide with the vehicle exceeds the first pre-determined threshold;

classify the at least one approaching vehicle as a medium-risk threat vehicle when the probability that the at least one approaching vehicle will collide with the vehicle exceeds a second pre-determined threshold; and classify the at least one approaching vehicle as a high-risk threat vehicle when the probability that the at least one approaching vehicle will collide with the vehicle exceeds a third pre-determined threshold;

determine a warning message including textual information and augmentation graphics including at least one of trajectory arrows, highlighting of threat vehicles, and warning icons to be provided to the occupant within the vehicle for each of the at least one approaching vehicle that is classified as a threat vehicle based on the classification of each threat vehicle as one of a low-risk threat vehicle, a medium risk threat vehicle or a high-risk threat vehicle;

determine if the warning message and the augmentation graphics will fit within a field of view (FOV) of the AR-HUD system;

project the warning message and augmentation graphics onto the inner surface of the windshield with the AR-HUD system when the warning message and the augmentation graphics fit within the FOV of the AR-HUD system; and project the warning message and augmentation graphics onto the inner surface of the windshield with the full windshield display system when the warning message and the augmentation graphics do not fit within the FOV of the AR-HUD system;

project, with the full windshield display system, a secondary warning message and secondary augmentation graphics onto an inner surface of at least one of a side window of the vehicle and a rear window of the vehicle; and provide information related to an intended route of the vehicle to entities outside the vehicle by projecting the information related to an intended route of the vehicle onto the inner surface of at least one of the side window of the vehicle and the rear window of the vehicle with the full windshield display system.

\* \* \* \* \*